US011362564B2

(12) United States Patent
Driker et al.

(10) Patent No.: US 11,362,564 B2
(45) Date of Patent: Jun. 14, 2022

(54) TEMPERATURE COMPENSATED LINEAR ACTUATOR AND ENCODER

(71) Applicant: KappaSense Ltd., Misgav (IL)

(72) Inventors: Michael Driker, Ma'alot (IL); Boris Kilunov, Karmiel (IL); Stanislav Podlisker, Nahariya (IL)

(73) Assignee: Kappasense Ltd., Misgav (IL)

( * ) Notice: Subject to any disclaimer, the term of this patent is extended or adjusted under 35 U.S.C. 154(b) by 1216 days.

(21) Appl. No.: 15/716,842

(22) Filed: Sep. 27, 2017

(65) Prior Publication Data

US 2018/0091017 A1   Mar. 29, 2018

(30) Foreign Application Priority Data

Sep. 29, 2016 (EP) ..................................... 16191424

(51) Int. Cl.
| | |
|---|---|
| *H02P 21/06* | (2016.01) |
| *H02K 11/21* | (2016.01) |
| *H02K 7/00* | (2006.01) |
| *H02K 41/03* | (2006.01) |
| *H02K 11/25* | (2016.01) |
| *H02K 5/04* | (2006.01) |

(Continued)

(52) U.S. Cl.
CPC ............. *H02K 7/003* (2013.01); *F16H 25/20* (2013.01); *F16H 25/24* (2013.01); *H02K 5/04* (2013.01); *H02K 11/21* (2016.01); *H02K 11/25* (2016.01); *H02K 41/03* (2013.01); *F16H 2025/2034* (2013.01); *F16H 2025/2075* (2013.01); *G01D 5/24* (2013.01); *G01J 5/041* (2013.01)

(58) Field of Classification Search
CPC .............. H02K 7/08; H02P 25/06; H02P 8/14
See application file for complete search history.

(56) References Cited

U.S. PATENT DOCUMENTS 6,074,382 A * 6/2000 Asah .................... A61B 18/203
                                                                          606/10
6,167,634 B1   1/2001 Pahk et al.
(Continued)

FOREIGN PATENT DOCUMENTS

| EP | 3040688 A2 | 7/2016 |
|---|---|---|
| WO | 03039810 A1 | 5/2003 |

OTHER PUBLICATIONS

European Search Report completed Apr. 3, 2017, pertaining to EP16191424 filed Sep. 29, 2016.

*Primary Examiner* — Muhammad S Islam
*Assistant Examiner* — Charles S Laughlin
(74) *Attorney, Agent, or Firm* — Dinsmore & Shohl LLP

(57) ABSTRACT

A linear actuator includes a casing that contains a moveable shaft moved by a motor in response to a drive signal and coupled to an encoder that determines an actual instantaneous position of the shaft and forms part of a control loop that adjusts the drive signal so as to ensure accurate positioning of the shaft. A temperature sensor mounted on the shaft produces a temperature signal indicative of instantaneously measured temperature, and a temperature compensator responsive to the measured temperature for generating a negative or positive offset for correcting the drive signal so as to move the shaft to a positon that is corrected for instantaneous expansion or contraction of the shaft owing to departures of the shaft's actual temperature from a known baseline temperature.

14 Claims, 7 Drawing Sheets

(51) Int. Cl.
*F16H 25/20* (2006.01)
*F16H 25/24* (2006.01)
*G01D 5/24* (2006.01)
*G01J 5/04* (2006.01)

(56) References Cited

U.S. PATENT DOCUMENTS

| | | |
|---|---|---|
| 6,739,067 B2 | 5/2004 | Muller |
| 6,958,588 B2 | 10/2005 | Engelfried |
| 8,240,060 B2 * | 8/2012 | Tullmann ............ G05B 19/404 |
| | | 33/702 |
| 10,064,521 B1 * | 9/2018 | Gawali .................. A47J 44/02 |
| 2003/0200671 A1 | 10/2003 | Muller |
| 2006/0218811 A1 * | 10/2006 | Sato ..................... G05B 19/404 |
| | | 33/702 |
| 2007/0164086 A1 | 7/2007 | Hochhalter et al. |
| 2008/0215178 A1 * | 9/2008 | Senda .................... B23Q 15/18 |
| | | 700/175 |
| 2012/0294688 A1 | 11/2012 | Tang et al. |
| 2016/0161292 A1 * | 6/2016 | Rohner ................ G01D 5/2415 |
| | | 324/662 |
| 2018/0045284 A1 * | 2/2018 | Rosengren .......... F16H 25/2015 |

* cited by examiner

TEMPERATURE COMPENSATED LINEAR ACTUATOR AND ENCODER

RELATED APPLICATION

This application claims priority from European Patent Application No. EP 16191424.7 filed Sep. 29, 2016 whose contents are incorporated herein by reference.

TECHNICAL FIELD

The present disclosure generally relates to linear actuators.

BACKGROUND

A linear actuator is an actuator that creates motion in a straight line, in contrast to the circular motion of a conventional electric motor. Linear actuators are used in machine tools and industrial machinery, in computer peripherals such as disk drives and printers, in valves and dampers, and in many other places where linear motion is required. Hydraulic or pneumatic cylinders inherently produce linear motion. Many other mechanisms are used to generate linear motion from a rotating motor. Linear actuators are also used in semiconductor fabrication where it is necessary to move an integrated circuit wafer by a controlled distance in the order of several microns.

In order to move a linear actuator by a specified distance, it is known to use linear encoders such as those disclosed in U.S. Pat. No. 6,739,067, which includes a scale unit arranged in a hollow body that is mounted to a mounting structure associated with the first object and includes a slot which extends in a direction of measurement. A scanning unit or reading head scans the scale unit and a carrier connected to the second object, wherein the carrier extends through the slot.

A linear encoder having such functionality may be coupled to the linear actuator externally but it is also known to integrate the two functions in a single unit.

U.S. Pat. No. 6,958,588 discloses a machine for machining a workpiece with a rotating tool, whose shaft temperature is monitored in contactless fashion. The positioning drive-mechanisms serve to position a tool, carried by the shaft, relative to the workpiece and are controlled by a control unit that takes into account temperature expansions of the shaft resulting from the temperature changes in the shaft. This achieves a machining precision that is independent of temperature and of temperature changes of the machine overall, of temperature changes in the coolant, and of temperature changes in the tool and the shaft.

US 2007/0164086 discloses a friction stir weld apparatus having a linear drive actuator and a separate friction stir weld device. Of particular relevance to the present disclosure is the description at paragraphs [0049] to [0053] from which it emerges that the welding head is moved by a linear motion controller that is responsive to a temperature sensor for compensating for thermal expansion or other change. The apparatus disclosed in US 2007/0164086 includes two separate motors: a first motor in the linear drive actuator and a second motor in the friction stir weld device. Both are brushless rotary motors. Rotation of the first motor in the linear drive actuator is converted to linear motion via a rotating nut that is articulated to a tubular thrust member that is capable of axial motion but is prevented from rotating. The first motor is servo driven and is controlled via conventional control means through a rotary encoder and reader. The friction stir weld device has a welding head that is rotated by the second motor and generates heat upon frictional contact with material, thus causing some of the material to plasticize and form a weld. The temperatures sensors are thermistors that are attached to bearings near the second motor and thus measure the high temperature of the welding head induced by the second motor. The measured temperature is used to compensate for thermal expansion of components in the friction stir weld device in order to improve depth control, which is important, particularly with respect to spot and/or stitch welding. The thermistors are not located near the linear drive actuator, which is a separate unit from the friction stir weld device; but they are electrically coupled by leads to the linear motion controller of the actuator through ports so that the temperature expansion of the friction stir weld device can be compensated for.

In the above-mentioned prior art, compensation for temperature-induced thermal expansion or contraction of the actuator is based on the measurement of ambient temperature in the vicinity of the actuator. Likewise, the thermal compensation provided in these systems assumes that any thermal expansion or contraction of the actuator is uniform across the whole length of the actuator and is independent of its geometry. This is acceptable for these actuators since a positioning accuracy in the order of 0.2-0.50 mm is acceptable for machine tools and welding heads. However, the compensation provided by these publications is too coarse to be applicable for very high-precision actuators such as are required in semiconductor fabrication.

U.S. Pat. No. 6,167,634 discloses a measurement and compensation system for thermal errors in a machine tool. A module is provided to compensate thermal errors of the machine tool. The module comprises an operating part, a data bank, an analog to digital converter, a counter and a digital input/output part. The data bank stores in all the coefficients applied to a thermal error modeling equation which governs a relation between temperatures and thermal errors at various operating conditions. The operating part determines all the coefficients of the thermal error modeling equation which are stored in the data bank and calculates the thermal errors corresponding to the temperatures of a plurality of the thermocouples by the temperatures of a plurality of thermocouples inputted from the A/D converter and the positional coordinates of the bed inputted from the counter. Then, digital data of the calculated thermal errors are inputted into the digital input/output part and the digital input/output part converts the digital data to digital signal to input the digital signals into the controller. A controller orders the machine tool to compensate the thermal errors at the positional coordinates of the bed and the feed of the spindle. The machine tool compensates for the thermal errors in advance in order to process precisely workpieces in spite of the occurrence of the thermal errors.

US 2003/200671 discloses a sealed linear encoder for determining the relative position of a first object and a second object. The sealed linear encoder includes a scale unit arranged in a hollow body that is mounted to a mounting structure associated with the first object and includes a slot which extends in a direction of measurement. A scanning unit for scanning the scale unit and a carrier connected to the second object, wherein the carrier extends through the slot. Sealing lips arranged at the hollow body and abutting the carrier so as to seal the carrier and a cover form-fitted to the hollow body for covering at least the slot.

WO 03/039810 discloses a machine for machining a part, comprising at least a circular or rotary tool and having a lathe spindle equipped with a shaft whereof the temperature is monitored by a non-contact temperature sensor which detects the radiation emitted by the shaft. The control system of the machine integrates the thermal expansions resulting from temperature changes of the shaft to control the positioning drive elements that are designed to position a tool borne by the shaft relative to the part.

US 2012/294688 discloses a milling machine spindle control system that includes a distance sensor and a temperature sensor.

US 2016/161292 discloses a capacitive linear encoder for determining positions comprising a scale and a read head for capacitively scanning the scale, wherein scale and read head are movable relative to one another. The scale has at least one, preferably capacitive, position reference marker.

A drawback of known systems such as that disclosed in U.S. Pat. No. 6,167,634 is the time it takes to reach thermal equilibrium, which renders them unsuited for high tolerance machining where accuracies in the order of microns are required notwithstanding rapid temperature fluctuations in the vicinity of the machine tool.

SUMMARY

It is therefore an object of the present disclosure to provide an improved linear actuator whose shaft movement is compensated for thermal expansion or contraction of the shaft and which takes into account the geometry of the shaft.

This object is realized in accordance with the present disclosure by a linear actuator having the features of claim 1.

The instantaneous temperature of the shaft is measured by a temperature sensor mounted in association with the shaft and is used by a temperature compensator to move the shaft to a position that is corrected for instantaneous expansion or contraction of the shaft owing to departures of the shaft's actual temperature from a known baseline temperature. Within the context of the invention and the appended claims, the term "in association with the shaft" means that the temperature sensor is mounted so as to measure the temperature of the shaft. Where on the shaft the temperature is measured or where the temperature sensor is located relative to the shaft are not critical provided that the temperature sensor measures the temperature of the shaft.

BRIEF DESCRIPTION OF THE DRAWINGS

In order to understand the present disclosure and to see how it may be carried out in practice, embodiments will now be described, by way of non-limiting example only, with reference to the accompanying drawings, in which.

DETAILED DESCRIPTION

In the following description of some embodiments, identical components that appear in more than one figure or that share similar functionality will be referenced by identical reference symbols.

Figure 1:
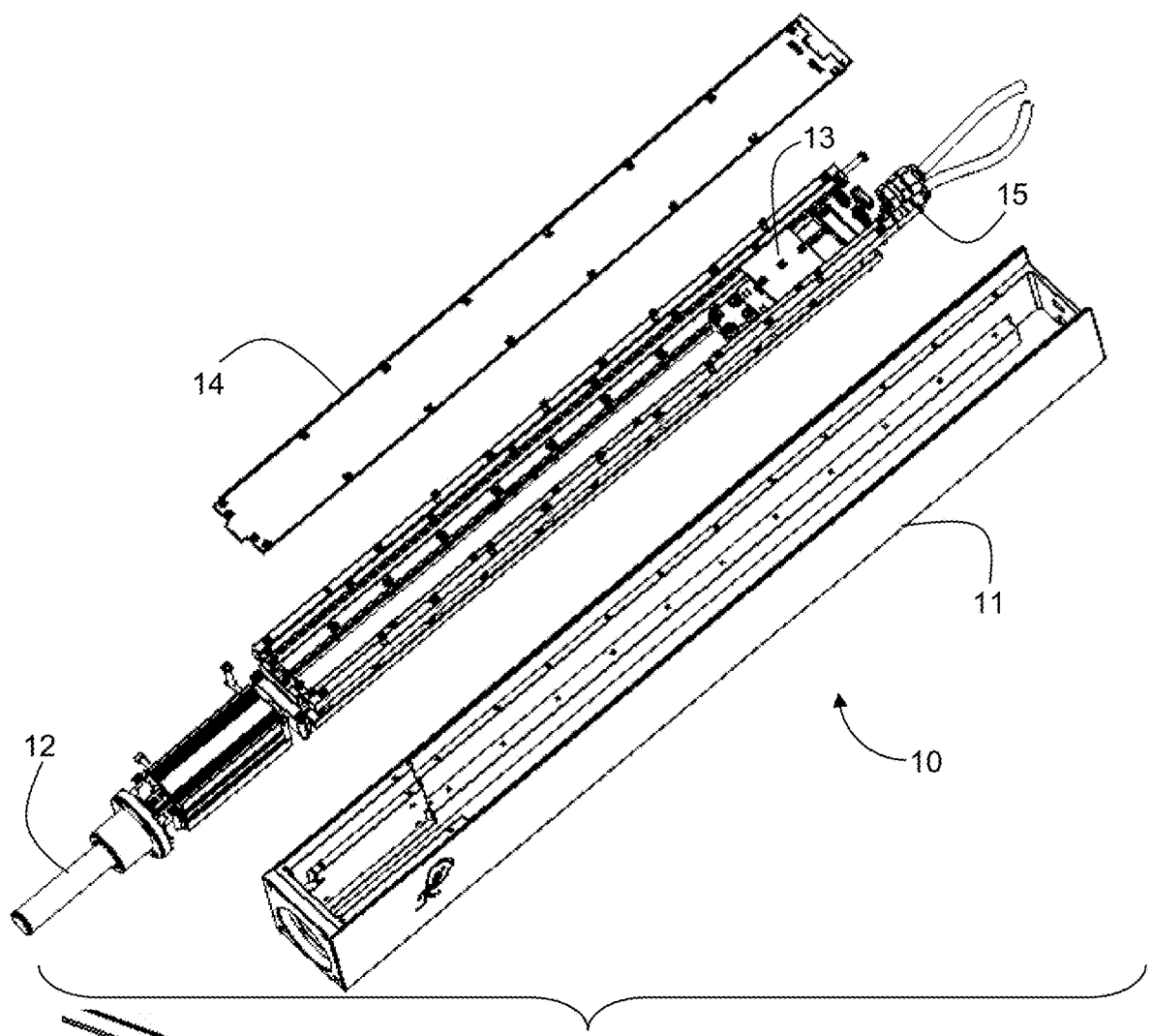
FIG. 1 is an exploded view showing the principal components of a linear actuator and encoder according to an embodiment of the present disclosure.

FIG. 1 is an exploded drawing showing the principal components of a linear actuator 10 having a sealed casing 11 that contains a moveable shaft 12 anchored at one end inside the casing to a reading head 13 that moves relative to a scale 14 by a predetermined distance in response to a drive signal provided by an external driver 16 (shown functionally in FIG. 11) via a connector 15. The reading head 13 and scale 14 form part of an absolute position passive read head linear encoder 17 (shown functionally in FIG. 11) that determines the actual (absolute) instantaneous position of the shaft and forms part of a control loop that adjusts the drive signal so as to ensure accurate positioning of the shaft. This is distinct from the device shown in US 2012/249688 that used an incremental linear encoder. The linear actuator 10 according to the present disclosure is independent of external or ambient temperature and requires neither prior knowledge of a starting or home position against which relative displacement is measured nor establishment of an equilibrium setpoint. Consequently, the actuator begins to operate at maximum resolution immediately upon actuation. Linear actuators and linear encoders are known per se and we will therefore provide only a brief description for the sake of completeness with regard to the detailed views shown in FIGS. 2 to 7.

Figure 2:
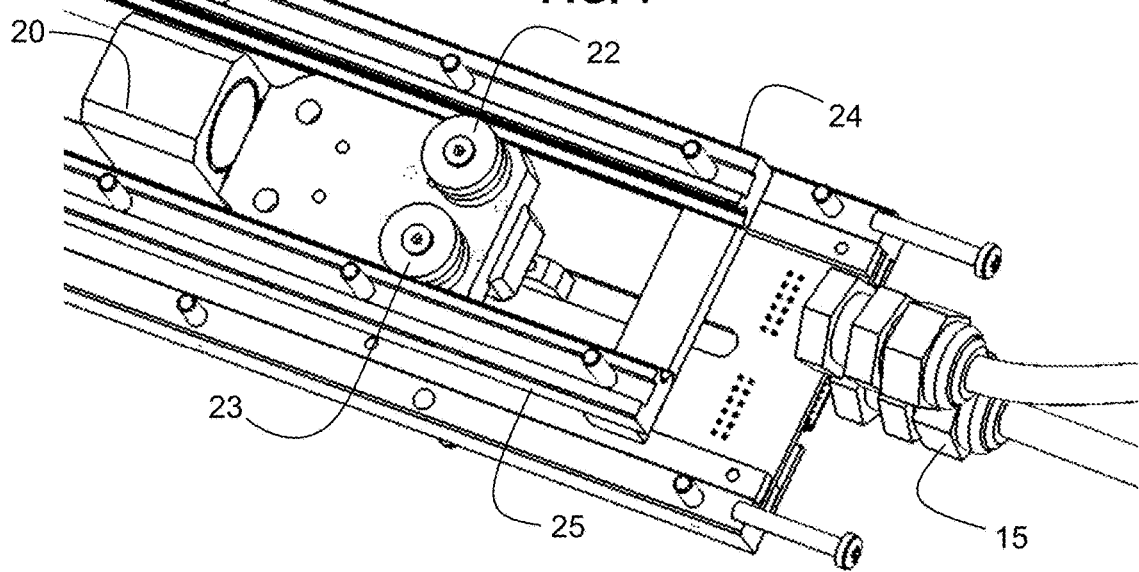
FIG. 2 shows a detail of the rear end of the linear actuator.
Figure 3:
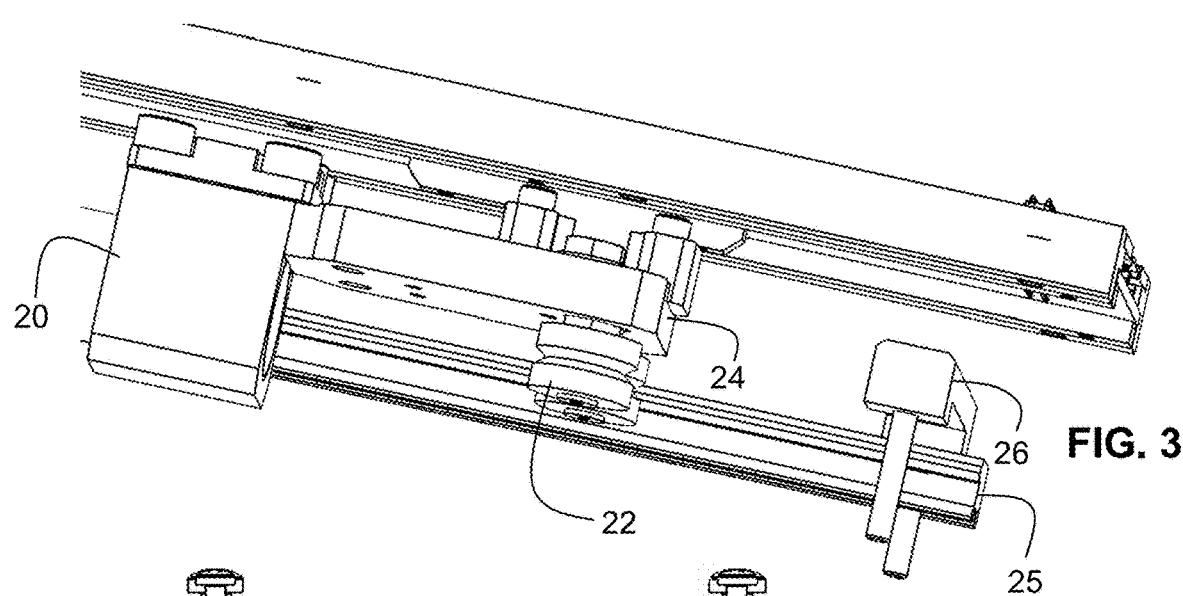
FIG. 3 shows a further detail of the rear end of the linear actuator.
Figure 4:
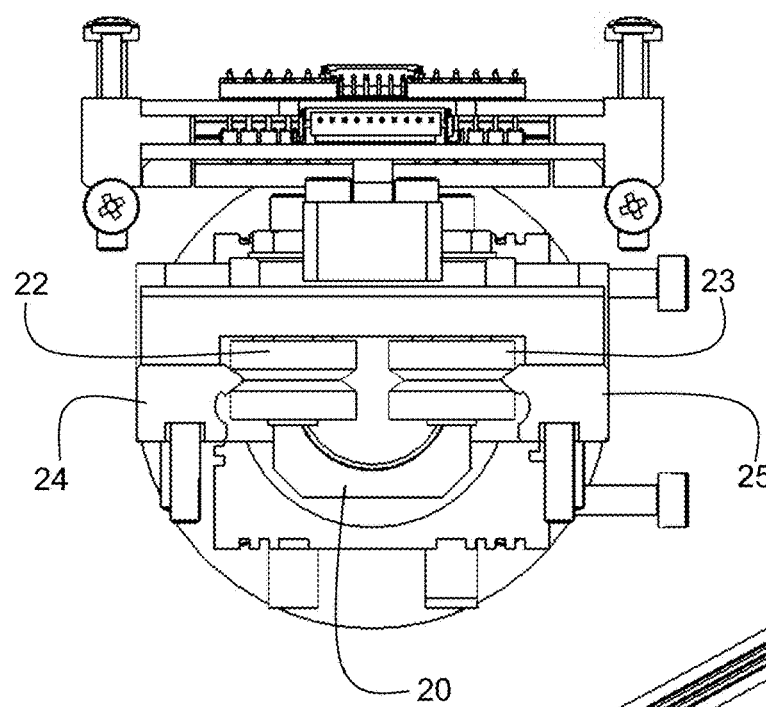
FIG. 4 shows a partial sectional elevation through the rear end of the actuator.
Figure 7:
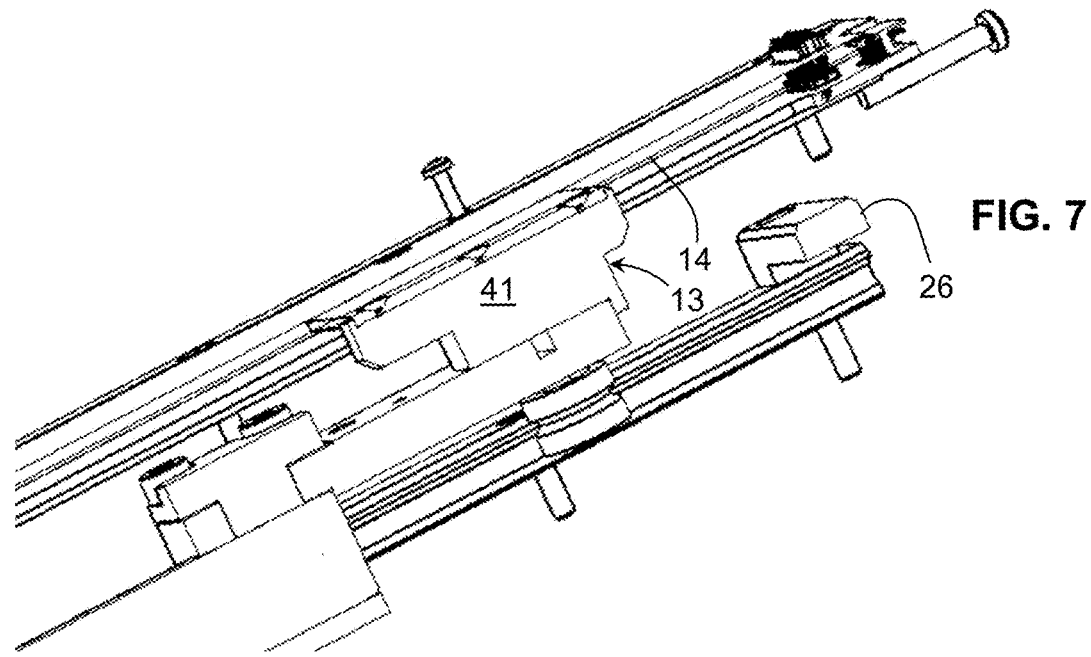
FIG. 7 shows a detail of the reading head and scale of the linear encoder.

Referring to FIGS. 2 to 4 it is seen that the shaft 12 extends through the casing and is anchored at its rear end to a mounting block 20 that is supported on a carriage 21, on a lower surface of which are rotatably mounted two pulleys 22, 23 that engage respective rails 24, 25. Both rails are shown in FIG. 2 but in FIG. 3 the rail 22 is removed so as to afford a clear view of the carriage 21, which allows the shaft 12 to move freely forward and backward. A rear buffer 26 attached to a lower mounting board (not shown) of the actuator limits backward motion of the carriage 21. An upper surface of the carriage 21 supports the reading head 13 of the encoder as best seen in FIG. 7.

Figure 5:
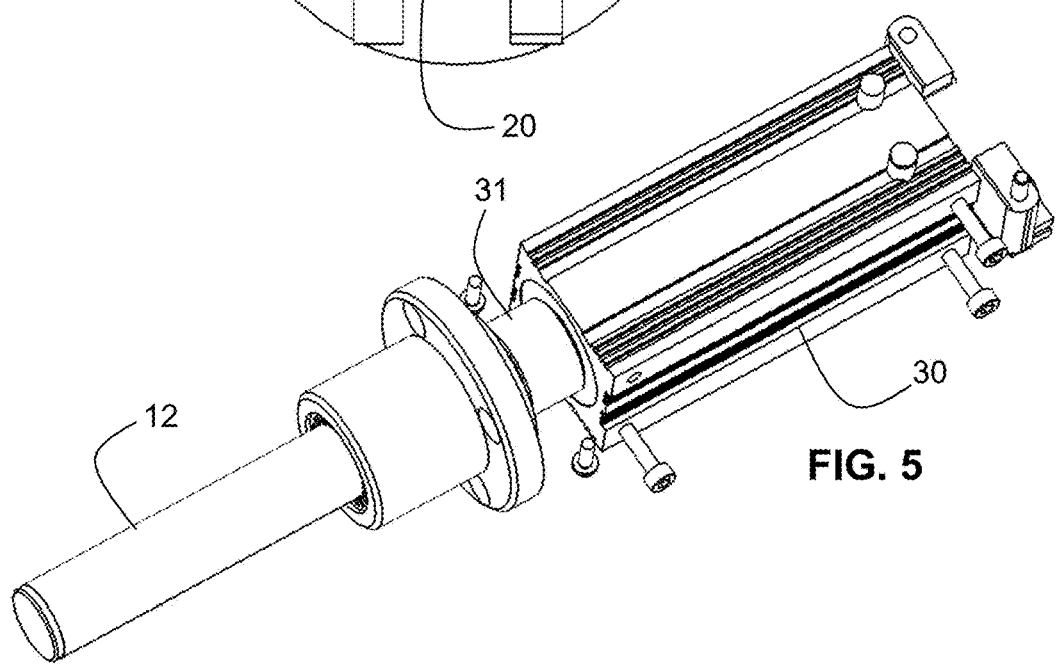
FIG. 5 shows a detail of the front end of the linear actuator.
Figure 6:
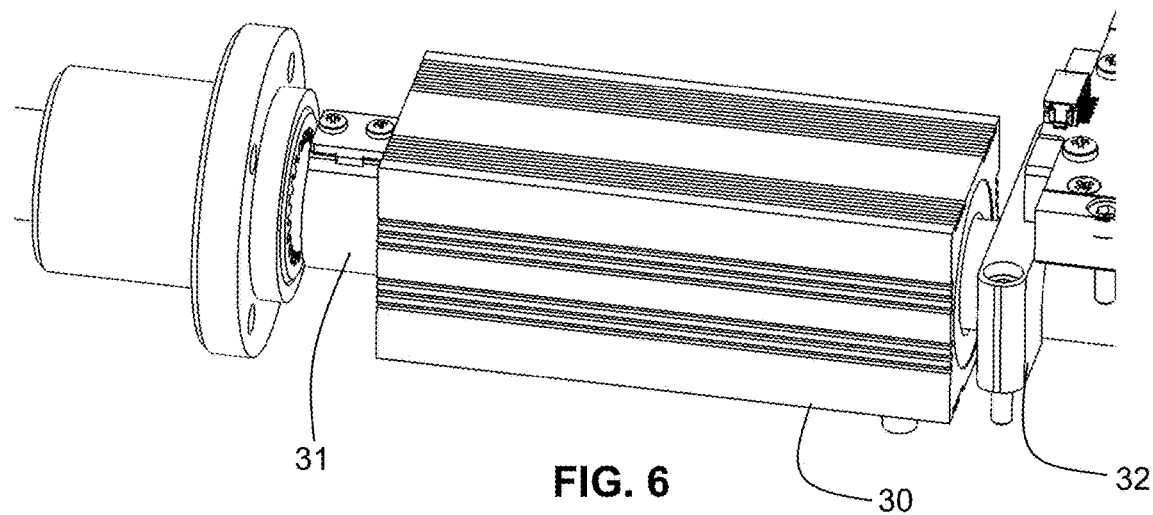
FIG. 6 shows a further detail of the front end of the linear actuator.

FIGS. 5 and 6 show partial details of the front end of the actuator. The shaft 12 extends through a linear stepper motor 30 having internal coils (not shown) to which power is fed to advance the shaft 12 forward or backward. A temperature sensor 31 is mounted circumferentially on the shaft 12 and may be located inside the casing 11 near the motor 30. The temperature sensor 31 measures the integrated temperature of the shaft 12 during movement thereof. Since the actuator is an absolute position device having a built-in absolute encoder, no external reference parameters are required. A front buffer 32 limits forward motion of the carriage 21 and hence of the attached shaft 12.

Figure 8:
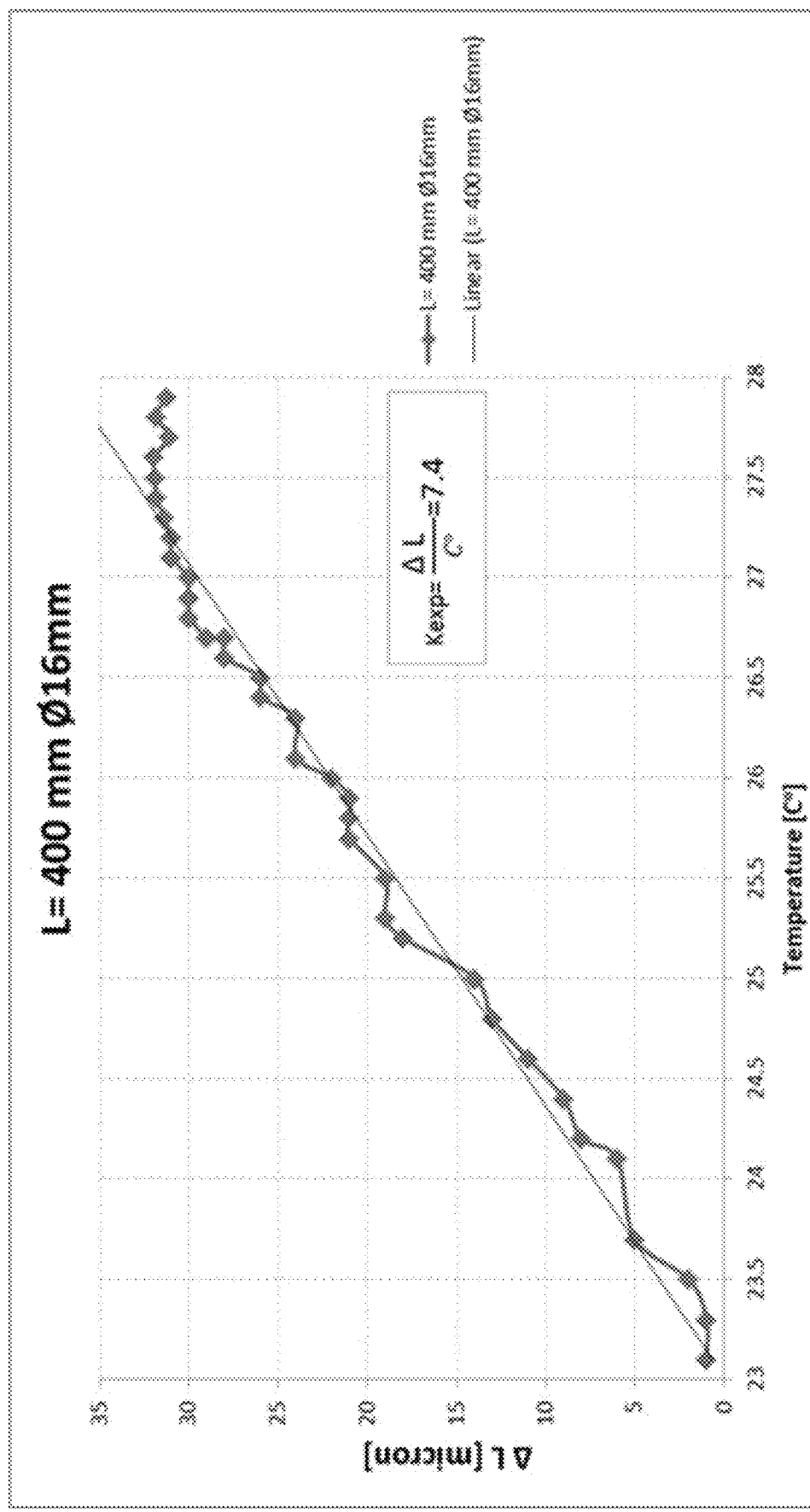
FIGS. 8 to 10 show graphically thermal expansion as a function of temperature change for actuator rods formed of identical material but with different geometries.
Figure 9:
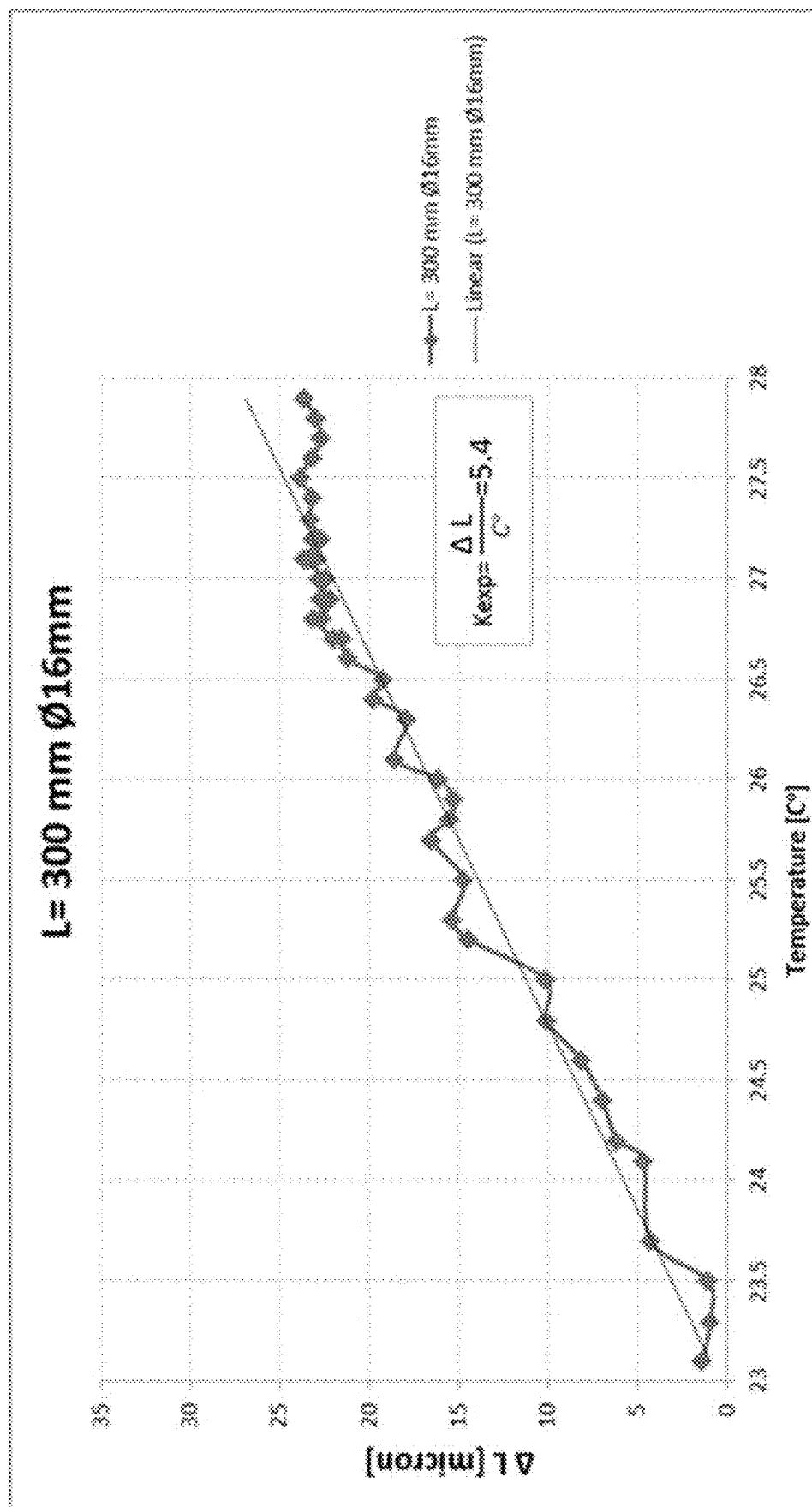
Figure 10:
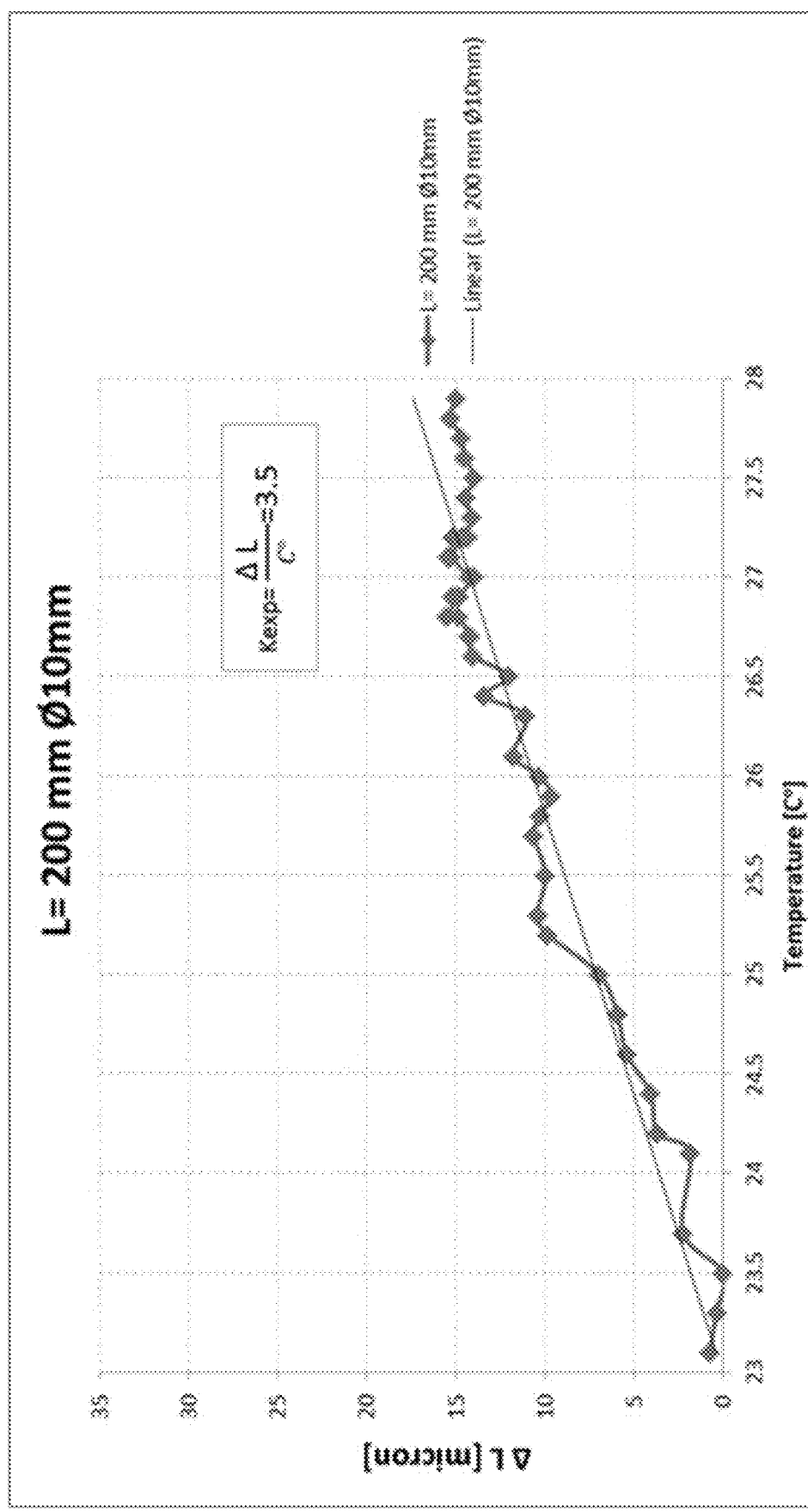

FIGS. 8, 9 and 10 are graphs showing thermal expansion measured as a function of temperature change for actuator rods formed of identical material but having different geometries. It is seen that the coefficients of thermal expansion are different in the three cases. Thus, in FIG. 8, for a shaft length of 400 mm and a shaft diameter of 16 mm, the coefficient of thermal expansion $K_{exp}$ given by $\Delta l/°$ C. is equal to 7.4 µm/°

C. In FIG. 9 for a shaft length of 300 mm and a shaft diameter of 16 mm, $K_{exp}$ is equal to 5.4 μm/° C. In FIG. 10 for a shaft length of 200 mm and a shaft diameter of 10 mm, $K_{exp}$ is equal to 3.5 μm/° C. This means that even for a low gauge shaft having a diameter of 10 mm and a length of 200 mm, a rise in temperature of only 1° C. will give rise to a thermal expansion of 3.5 μm. In most applications such as welding, such an expansion is insignificant. But in semiconductor fabrication and other nanotechnology applications, such a deviation is critical.

In an embodiment of the present disclosure reduced to practice, the temperature sensor 31 is an LM73 digital temperature sensor manufactured by Texas Instruments having an accuracy of ±1° C. over a range of −10° C. to +80° C. In a default 11-bit mode of operation it measures temperature to within 0.25° C./LSB in a maximum time of 14 ms. In a 14-bit mode of operation it has a temperature resolution of 0.03125° C./LSB thus making it particularly suitable for measurement of very small temperature changes.

It will, however, be understood that other suitable types of temperature sensor may be used. Furthermore, the temperature of the shaft does not require that the temperature sensor be physically mounted on the shaft. The present disclosure also contemplates the use of infrared sensors, for example, that measure the shaft temperature remotely.

Figure 11:
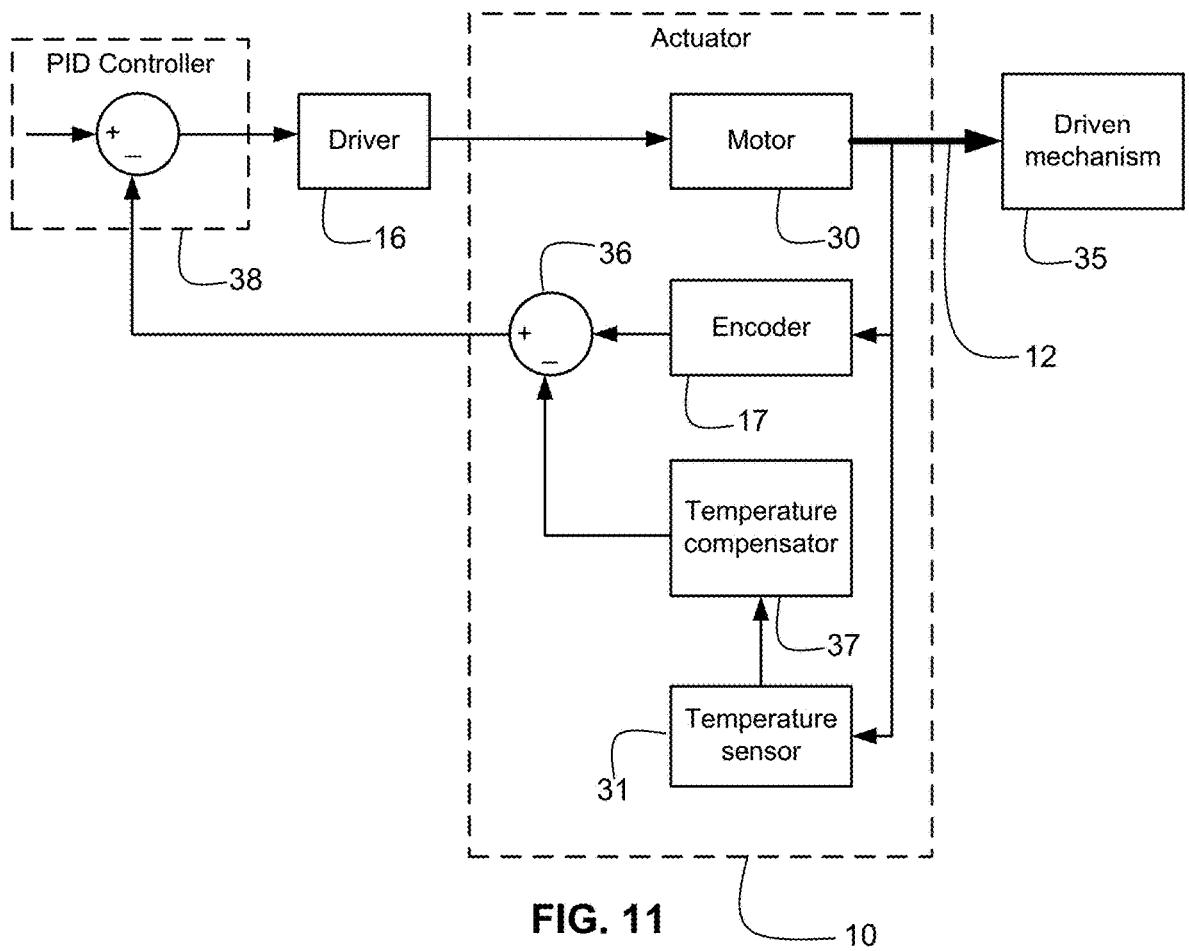
FIG. 11 is a block diagram showing functionality of a temperature-compensated linear actuator/encoder according to the present disclosure.

FIG. 11 is a block diagram showing functionality of the linear actuator 10 for achieving the required temperature compensation so that the shaft 12 can be moved forward or backward by a precisely controlled distance regardless of local changes in the temperature of the shaft and independent of ambient temperature. As already described, the actuator 10 comprises a motor 30 that advances a shaft 12 forward or backward and is coupled to a driven mechanism 35 that is external to the actuator and is not part of the present disclosure. In FIG. 11 the shaft 12 is shown schematically by an arrow that couples the shaft 12 of the motor 30 to the driven mechanism 35. Also shown is the encoder 17, which is responsively coupled to the shaft 12 of the motor 30 and determines its position in known manner. The output of the encoder 17 is fed to an input of a first subtractor 36 having a negative input to which is coupled the output of a temperature compensator 37. Consequently, the first subtractor 36 generates a signal corresponding to the difference between the nominal position signal of the shaft 12 and a temperature compensation signal. The temperature compensator 37 is responsive to the instantaneous temperature of the shaft 12 as measured by the temperature sensor 31 for determining a compensation signal, which when fed to the first subtractor 36 produces a corrected encoder difference signal that takes into account the fact that the shaft 12 has expanded or contracted from a nominal baseline length as established at a known baseline temperature according to whether the instantaneous temperature of the shaft 12 is higher or lower than the baseline temperature.

The corrected encoder difference signal is fed to a proportional-integral-derivative controller (PID) controller 38, which continuously calculates an error value ε(t) as the difference between a desired driver signal and the corrected encoder difference signal and minimizes the error over time by adjustment of a control variable u(t), corresponding to the position of the motor shaft 12 to a new value determined by a weighted sum:

$$u(t) = K_p \varepsilon(t) K_i \int_0^t \varepsilon(t) + K_d \frac{d\varepsilon(t)}{dt}$$

where $K_p$, $K_i$ and $K_d$ are all non-negative and denote the coefficients for the proportional, integral, and derivative terms, respectively. In this model:

P accounts for present values of the error. For example, if the error is large and positive, the control output will also be large and positive.

I accounts for past values of the error. For example, if the current output is not sufficiently strong, error will accumulate over time, and the controller will respond by applying a stronger action.

D accounts for possible future values of the error, based on its current rate of change.

It will, however, be understood that the provision of a PID controller is not mandatory and other types of servo-control may be used instead.

The temperature compensator 37 includes a look-up table or ROM, which stores measured values of the thermal expansion or contraction of the shaft 12 for different temperatures relative to a known baseline. These values take into account the geometry of the shaft as well as the material from which it is formed and are used in real time to establish a negative or positive offset that must be added to the movement of the shaft 12 so that when moved to a desired position it reaches exactly the desired position and not to a position that is incorrect by the instantaneous expansion or contraction of the shaft owing to departures of the shaft's actual temperature from the baseline temperature. If desired, the temperature compensator 37 may also include an interpolator for interpolating between values in the look-up table when the look-up table does not store the offset for the measured instantaneous temperature of the shaft.

Figure 12:
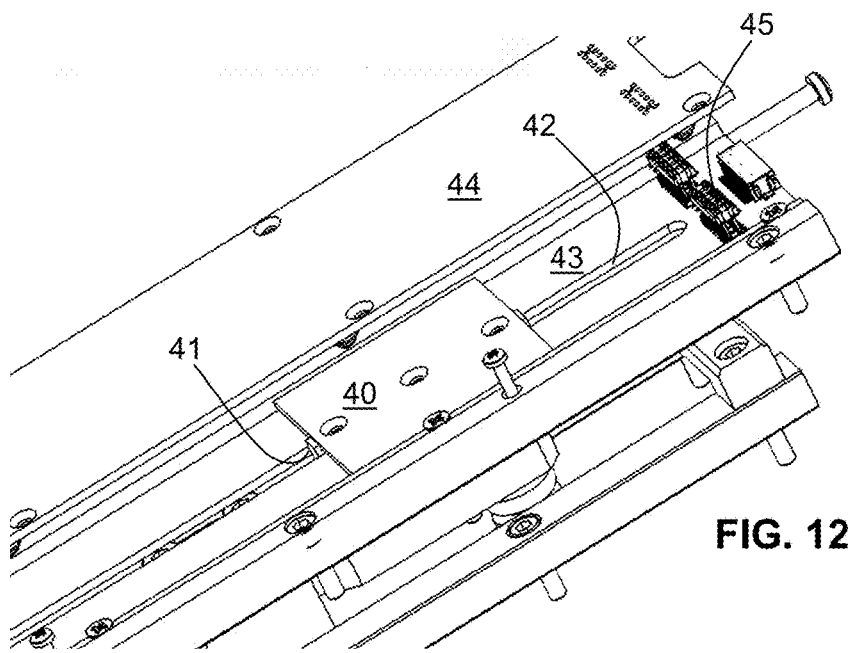
FIG. 12 shows a partially exploded detail of the encoder reading head.

Preferably, the encoder 17 employs a capacitive reading head shown in enlarged detail in FIG. 12. The reading head 13 includes an element 40 formed of a dielectric supported on the carriage 24 by an arm 41 shown more clearly in cross-section in FIG. 7. The element 40 extends through an axial slot 42 in a lower plate 43 of a capacitor having an upper plate 44, which is moved out of location in the figure so as not to obscure the element 40. The capacitor plates 43, 44 are printed circuit boards formed of an electrically insulating substrate coated with a thin electrically conductive layer such that when the carriage moves, the element 40 slides along the air gap between the two plates of the capacitor and changes its capacitance, which thus serves as a measure of the shaft's location. The reading head 13 of this sensor is passive in that it requires no wires, which improves accuracy and simplifies design and assembly. Furthermore, since the only connections to the capacitor are via fixed terminal blocks 45 there are no moving wires, which are susceptible to fatigue failure over extended use.

It will be understood, the same principle of temperature compensation may also be applied to all types of linear actuators such as screw drive actuators, linear motor drive actuators, piezo-motor drive actuators, pneumatic, hydraulic actuators and so on.

Thus, while the linear actuator as described has a linear motor that induces direct to and fro linear motion, similar in principle to a solenoid, it may also be a rotary motor that induces linear motion of the shaft via a suitable rotary-linear transducer such as shown, for example, in above-referenced US 2007/0164086. In this case, the transfer function of the transducer will also be used by the temperature compensator in order to ensure precise linear motion of the end of the shaft. For example, if a screw mechanism is employed to convert the rotary motion of the motor to linear motion of the shaft, then the relevant transfer function for correlating angular rotation of the motor to linear motion of the shaft will be a function of the screw pitch. The important thing is not how linear motion of the actuator is produced but rather the fact that compensation of thermal changes is effected by directly measuring the temperature of the motor shaft rather than ambient temperature or the temperature of a local hot-spot remote from the shaft.

It should be noted that features that are described with reference to one or more embodiments are described by way of example rather than by way of limitation to those embodiments. Thus, unless stated otherwise or unless particular combinations are clearly inadmissible, optional features that are described with reference to only some embodiments are assumed to be likewise applicable to all other embodiments also.

What is claimed is:

1. A linear actuator system comprising:
    a casing that contains a moveable shaft that is moved by a motor in response to a drive signal and is coupled to an encoder that determines movement of the shaft and forms part of a control loop that adjusts the drive signal so as to ensure accurate positioning of the shaft;
    a temperature sensor mounted in association with the shaft for producing a temperature signal indicative of instantaneously measured temperature of the shaft; and
    a temperature compensator responsive to the measured temperature for generating a negative or positive offset for correcting the drive signal so as to move the shaft to a position that is corrected for instantaneous expansion or contraction of the shaft owing to departures of the shaft's actual temperature from a known baseline temperature;
    wherein:
    the motor advances the shaft forward or backward and is configured for coupling to a driven mechanism that is external to the actuator;
    the encoder is a linear encoder that includes a reading head and scale and determines an actual instantaneous position of the shaft;
    the shaft is anchored at one end to the reading head; and
    the temperature compensator is responsive to a known geometry of the shaft for generating said offset;
    an output of the encoder is fed to an input of a first subtractor that produces at an output thereof an encoder difference signal;
    the output of the temperature compensator is coupled to a negative input of the first subtractor;
    the temperature compensator is responsive to the instantaneous temperature of the shaft as measured by the temperature sensor for determining a compensation signal, which when fed to the first subtractor produces a corrected encoder difference signal that takes into account the fact that the shaft has expanded or contracted from a nominal baseline length as established at a known baseline temperature according to whether the instantaneous temperature of the shaft is higher or lower than the baseline temperature;
    the corrected encoder difference signal is fed to a proportional-integral-derivative controller (PID) controller, which continuously calculates an error value ε(t) as the difference between a desired driver signal and the corrected encoder difference signal and minimizes the error over time by adjustment of a control variable u(t), corresponding to the position of the motor shaft to a new value determined by a weighted sum:

$$u(t) = K_p \varepsilon(t) + K_i \int_0^t \varepsilon(t) + K_d \frac{d\varepsilon(t)}{dt}$$

where $K_p$, $K_i$ and $K_d$ are all non-negative and denote the coefficients for the proportional, integral, and derivative terms, respectively.

2. The linear actuator system according to claim 1, wherein the temperature compensator includes a look-up table, which stores measured values of the thermal expansion or contraction of the shaft for different geometries and for different temperatures relative to the known baseline temperature.

3. The linear actuator system according to claim 2, wherein the temperature compensator further includes an interpolator for interpolating between values in the look-up table when the look-up table does not store the offset for the measured instantaneous temperature of the shaft.

4. The linear actuator system according to claim 1, wherein the temperature sensor is mounted on the shaft.

5. The linear actuator system according to claim 1, wherein the temperature sensor is a non-contact sensor.

6. The linear actuator system according to claim 5, wherein the temperature sensor is an infrared sensor.

7. The linear actuator system according to claim 1, wherein the temperature sensor is mounted inside the casing.

8. The linear actuator system according to claim 1, wherein the motor is a linear motor.

9. The linear actuator system according to claim 1, wherein the motor is a linear stepper motor having internal coils to which power is fed to advance the shaft forward or backward.

10. The linear actuator system according to claim 1, wherein:
    the encoder is a capacitive sensor having a pair of separated electrically conductive plates, and
    the reading head includes a dielectric supported for sliding movement along an air gap between the two plates of the capacitor in response to movement of the shaft for changing capacitance of the capacitive sensor.

11. The linear actuator system according to claim 1, wherein the motor is a rotary motor configured to induce linear motion of the shaft via a transducer.

12. The linear actuator system according to claim 1, wherein the encoder includes a passive reading head to which no wires are connected.

13. The linear actuator system according to claim 1, wherein the encoder is an absolute position passive read head encoder.

14. The linear actuator system according to claim 1, wherein the temperature sensor is mounted circumferentially on the shaft and is located inside the casing near the motor.

* * * * *